(12) United States Patent
Nakashiba et al.

(10) Patent No.: US 8,541,050 B2
(45) Date of Patent: Sep. 24, 2013

(54) METHOD FOR MANUFACTURING OPTICAL WAVEGUIDE

(75) Inventors: Tohru Nakashiba, Osaka (JP); Shinji Hashimoto, Kadoma (JP); Naoyuki Kondou, Sakai (JP)

(73) Assignee: Panasonic Corporation, Osaka (JP)

( * ) Notice: Subject to any disclaimer, the term of this patent is extended or adjusted under 35 U.S.C. 154(b) by 300 days.

(21) Appl. No.: 12/988,401

(22) PCT Filed: Apr. 20, 2009

(86) PCT No.: PCT/JP2009/058215
§ 371 (c)(1),
(2), (4) Date: Oct. 18, 2010

(87) PCT Pub. No.: WO2009/131229
PCT Pub. Date: Oct. 29, 2009

(65) Prior Publication Data
US 2011/0033614 A1 Feb. 10, 2011

(30) Foreign Application Priority Data
Apr. 24, 2008 (JP) .................................. 2008-114314

(51) Int. Cl.
*B05D 5/06* (2006.01)
(52) U.S. Cl.
USPC ...................... 427/163.2; 427/331; 427/372.2
(58) Field of Classification Search
USPC .................................... 427/163.2, 331, 372.2
See application file for complete search history.

(56) References Cited

U.S. PATENT DOCUMENTS

| | | | |
|---|---|---|---|
| 6,611,651 | B1 | 8/2003 | Ogawa et al. |
| 2004/0218889 | A1* | 11/2004 | Shelnut et al. ................ 385/143 |
| 2008/0226245 | A1* | 9/2008 | Higuchi et al. ............... 385/127 |
| 2009/0074374 | A1 | 3/2009 | Fujiue et al. |
| 2010/0040986 | A1 | 2/2010 | Yamaguchi et al. |

FOREIGN PATENT DOCUMENTS

| | | |
|---|---|---|
| CN | 1523382 | 8/2004 |
| JP | 2000-356720 | 12/2000 |
| JP | 2001-296440 | 10/2001 |
| JP | 2007-084765 | 4/2007 |
| JP | 2007-238868 | 9/2007 |
| WO | 02/054117 | 7/2002 |
| WO | WO 2005081024 | * 9/2005 |
| WO | 2007/105556 | 9/2007 |
| WO | 2008/035658 | 3/2008 |

OTHER PUBLICATIONS

Toru Nakashiba et al., "Optical-Electrical Flexible Printed Wiring Board", MEW Technical Report, pp. vol. 54 No. 3 (Sep. 2006).

(Continued)

*Primary Examiner* — Elizabeth Burkhart
(74) *Attorney, Agent, or Firm* — Greenblum & Bernstein, P.L.C.

(57) ABSTRACT

An object is to manufacture an optical waveguide having low optical loss, by smoothing the surface of a core. To this end, a method for manufacturing an optical waveguide includes: a core-forming layer formation step of forming a core-forming layer of a photosensitive polymer on a surface of a lower cladding layer formed on a substrate; a smoothing step of smoothing the surface by lowering a surface viscosity thereof through a heat treatment of the core-forming layer; and a photocuring step of forming a core through selective exposure of the smoothed core-forming layer.

9 Claims, 4 Drawing Sheets

(56) References Cited

OTHER PUBLICATIONS

China Office action, mail date is Feb. 28, 2012.
Korea Office action, dated Dec. 19, 2011, along with an english translation thereof.
Chung-Yen Chao et al., "Thermal-flow technique for reducing surface roughness and controlling gap size in polymer microring ersonators", Applied Physics Letters, vol. 84, No. 14, Apr. 5, 2004, pp. 2479-2481.
Chung-Yen Chao et al., "Reduction of Surface Scattering Loss in Polymer Microrings Using Thermal-Reflow Technique", IEEE Photonics Technology Letters, vol. 16, No. 6, Jun. 2004, pp. 1498-1500.
Japan Office action, mail date is Nov. 20, 2012.

* cited by examiner

METHOD FOR MANUFACTURING OPTICAL WAVEGUIDE

TECHNICAL FIELD

The present invention relates to a method for manufacturing an optical waveguide.

BACKGROUND ART

Recent years have witnessed a rapid spread of wider bandwidth technologies in communications infrastructure as well as dramatic advances in the information-processing ability of computers. In accordance with such advances, information processing circuit substrates having high-speed information transmission paths have been required than ever before. In this context, signal transmission using light is being studied as a means for overcoming the transmission speed limits of electric signals. Polymer optical waveguides, which can be processed inexpensively, have received attention as circuit substrates that can transmit signals optically.

Known methods for manufacturing polymer optical waveguides involve, for instance, lithographic patterning of a layer comprising a photosensitive polymer (for instance, Patent document 1 or Non-patent document 1). An outline of such a method is set forth below.

Firstly, a film layer comprising a photosensitive polymer for forming a core is formed on the surface of a lower cladding layer that is formed on the surface of a substrate. The photosensitive polymer film layer thus formed is then irradiated with UV rays, via a photomask having formed thereon a circuit pattern, to selectively cure thereby the portions where the core is to be formed. The core is formed then by developing, whereby uncured portions are removed. The core is covered with a material for forming an upper cladding layer.

The film layer for core formation may be formed, for instance, in accordance with the following method. A liquid photosensitive polymer or a varnish of a solid photosensitive polymer is coated onto the surface of a lower cladding layer, formed on the surface of a substrate, and is then dried. In another method, a photosensitive polymer varnish is coated first onto the surface of a support substrate, and is then dried to form a dry film. This dry film is then laminated onto the surface of a lower cladding layer that is formed on the surface of a substrate.

Patent document 1: Japanese Patent Application Laid-open No. 2007-084765
Non-Patent document 1: "Optical-Electrical Flexible Printed Wiring Board", MEW Technical Report, Vol. 54, No. 3 (September 2006)

DISCLOSURE OF THE INVENTION

The present invention aims at manufacturing an optical waveguide having low optical loss, by smoothing the surface of a core.

An aspect of the present invention is a method for manufacturing an optical waveguide, the method comprising: a core-forming layer forming step of forming a core-forming layer of a photosensitive polymer on a lower cladding layer formed on a substrate; a smoothing step of smoothing the surface of the core layer by lowering a surface viscosity thereof through a heat treatment of the core-forming layer; and an exposure step of forming a core through selective exposure of the smoothed core-forming layer.

The present invention allows forming a core having a smooth surface. An optical waveguide having low light loss through therein is obtained as a result.

These and other objects, features and advantages of the present invention will become more apparent upon reading of the following detailed description along with the accompanying drawings.

BEST MODE FOR CARRYING OUT THE INVENTION

Figure 1A:
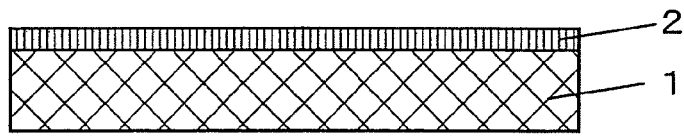
FIG. 1A is a schematic cross-sectional diagram for explaining one step in a method for manufacturing an optical waveguide in one embodiment of the present invention.

Formation of a film layer for forming a core of a photosensitive polymer was problematic in terms of uneven thickness of the film layer and entrapment of bubbles and voids in the surface of the film layer. These trapped bubbles and voids in the surface give rise to the following problems. The surface condition of the film layer is made inhomogeneous by the trapped bubbles and/or voids. Upon irradiation of UV rays or the like to selectively cure the film layer, the inhomogeneous surface condition of the film layer persists in the form of an inhomogeneous surface condition in the formed core. This inhomogeneous surface condition results in guided light scattering, which exacerbates optical loss. The inhomogeneous surface condition gives rise also to light scattering during selective exposure, as a result of which exposure light reaches into masked portions that are not to be exposed. This is problematic in that the contour of the core fails to be obtained as intended, with optical loss increasing as a result.

The method for manufacturing an optical waveguide of the present embodiment comprises: a core-forming layer forming step of forming a core-forming layer of a photosensitive polymer, on a lower cladding layer formed on a substrate; a smoothing step of smoothing the surface of the core-forming layer by lowering the surface viscosity thereof through a heat treatment of the core layer; and an exposure step of forming a core through selective exposure to form a core from the surface of the smoothed core-forming layer.

Preferred embodiments of the present invention are explained below with reference to accompanying drawings.

FIG. 1A to FIG. 1F is a process diagram for explaining the present embodiment. In FIG. 1A to FIG. 1F, the reference numeral denotes a substrate, 2 denotes a lower cladding layer, 3 denotes a core-forming layer, 4 denotes a photomask, 5 denotes a core and 6 denotes an upper cladding layer.

As the substrate 1 there may be used various organic and inorganic substrates, without any particular limitation.

Specific examples of organic substrates include epoxy substrates, acrylic substrates, polycarbonate substrates, polyimide substrates and the like. Examples of inorganic substrates include, for instance, silicon substrates or glass substrates. Also, an electric circuit may be formed on the substrate.

In the manufacturing method of the present embodiment, the lower cladding layer 2 is formed first on the substrate 1, as illustrated in FIG. 1A.

The method for forming the lower cladding layer 2 may involve, for instance, bonding a resin film comprising a curable resin material having a predetermined refractive index, for forming the lower cladding layer 2, on the surface of the substrate 1, followed by curing, or may involve coating a liquid curable resin for forming the lower cladding layer 2, followed by curing, or coating a curable resin varnish, followed by curing. When forming the lower cladding layer 2, the surface of the substrate 1 is preferably subjected beforehand to a surface treatment, such as a plasma treatment, in order to activate the surface and increase thus the adherence thereof.

The curable resin used for forming the lower cladding layer 2 is a material having a lower refractive index, at the transmission wavelength of the guided light, than the core 5. The refractive index at the transmission wavelength is, for instance, of about 1.5 to 1.55.

Examples of such a curable resin include, for instance, epoxy resins, acrylic resins, polycarbonate resins and polyimide resins having a refractive index within the above range.

The thickness of the lower cladding layer 2 is not particularly limited, but ranges preferably, for instance, from about 5 to 15 μm.

Methods for forming the lower cladding layer 2 using a resin film include, for instance, the following.

Firstly, a resin film comprising a curable resin is overlaid on the surface of the substrate 1, and is bonded to the substrate 1 by heat-pressing. In another method, the resin film may be bonded to the surface of the substrate 1 by way of a transparent adhesive. When the resin film is a photocurable resin, the latter is cured through irradiation of light. When the resin film is a thermosetting resin, the latter is cured through heating.

Methods for forming the lower cladding layer 2 using a liquid curable resin include, for instance, the following.

Firstly, a liquid curable resin or a curable resin varnish is coated onto the surface of the substrate 1. The coating method used is not particularly limited, and may be spin coating, bar coating or dip coating. When the coated curable resin is a photocurable resin, the resin is cured through irradiation of light. When the coated curable resin is a thermosetting resin, the resin is cured through heating.

Figure 1B:
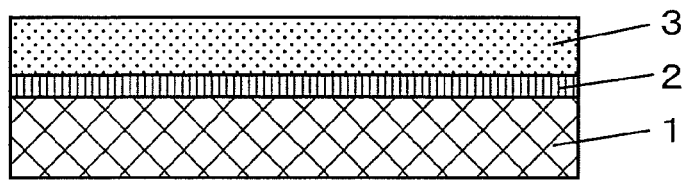
FIG. 1B is a schematic cross-sectional diagram for explaining one step in a method for manufacturing an optical waveguide in one embodiment of the present invention.

Next, the core-forming layer 3, comprising a photosensitive polymer material, is formed on the outer surface of the lower cladding layer 2, as illustrated in FIG. 1B.

The method for forming the core-forming layer 3 may involve bonding a resin film comprising a photosensitive polymer having a predetermined refractive index, for forming the core 5, onto the surface of the lower cladding layer 2. In another method, there may be applied a liquid photosensitive polymer for forming the core-forming layer 3. In yet another method, there may be applied a varnish of a photosensitive polymer for forming the core-forming layer 3, followed by drying. When forming the core-forming layer 3, the surface of the lower cladding layer 2 is preferably subjected beforehand to a surface treatment, such as a plasma treatment, in order to activate the surface and increase thus the adherence thereof.

Herein, photosensitivity refers to the property of undergoing a modification upon being irradiated with light. Examples of such a modification include, for instance, hardening, softening, changes in solubility towards a specific solvent, or changes in refractive index. The light may be energy beams typified by UV rays, but is not limited thereto. The light used may be light of some other wavelength, depending on the characteristics of the core-forming layer 3.

Figure 2:
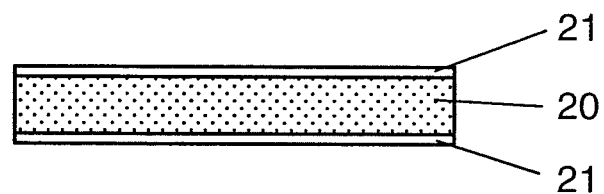
FIG. 2 is a schematic cross-sectional diagram for explaining the build-up of a dry film.

The resin film comprising a photosensitive polymer may be, for instance, a dry film obtained by coating a photosensitive polymer material, in a semi-cured state, onto a support substrate (protective film) such as a polyethylene terephthalate (PET) film. As illustrated in FIG. 2, a dry film 20 is protected on both sides by a protective film 21.

The photosensitive polymer used for forming the core-forming layer 3 has a higher refractive index, at the transmission wavelength of the guided light, than the lower cladding layer 2. Preferably, the refractive index at the transmission wavelength is, for instance, of about 1.55 to 1.6.

Examples of photosensitive polymers for forming the core-forming layer 3 include, for instance, photosensitive materials such as photocurable materials comprising a resin component of an epoxy resin, an acrylic resin, a polycarbonate resin or a polyimide resin having a refractive index lying within the above range.

Particularly preferred among the foregoing, in terms of superior heat resistance, is a photocurable resin composition containing a bisphenol-type epoxy resin and a photo-cationic curing agent. An optical waveguide having a high heat resistance can be combined with a printed board that undergoes reflow-processing.

From the viewpoint of adherence, the photosensitive polymer for forming the core-forming layer 3 and the curable resin for forming the lower cladding layer 2 are preferably resins belonging to the same resin type.

The thickness of the core-forming layer 3 is not particularly limited, but ranges preferably, for instance, from about 20 to 100 μm.

Specific methods for bonding the resin film comprising a photosensitive polymer for forming the core-forming layer 3 include, for instance, the following.

Firstly, a resin film comprising a photosensitive polymer may be overlaid on the surface of the lower cladding layer 2, and may be bonded to the surface by heat-pressing. In another method, the resin film may be bonded to the surface of the lower cladding layer 2 by way of a transparent adhesive.

An example of the method used for forming the core-forming layer 3 using a liquid photosensitive polymer may be the following.

Firstly, a liquid photosensitive polymer or a varnish of a photosensitive polymer is coated onto the surface of the lower cladding layer 2. The varnish coat is then dried as the case may require.

Figure 1C:
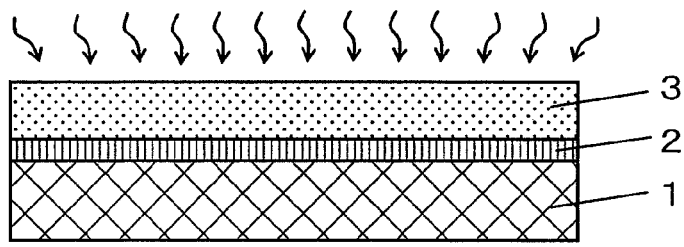
FIG. 1C is a schematic cross-sectional diagram for explaining one step in a method for manufacturing an optical waveguide in one embodiment of the present invention.

In the manufacturing method of the present embodiment, the viscosity of the surface of the core-forming layer 3 is lowered, by way of a heat treatment, as illustrated in FIG. 1C, before curing or the like the core-forming layer 3 through selective exposure of the latter. The surface of the core-forming layer 3 is softened or melted as a result of such a heat treatment. Through surface tension effects, the heat treatment eliminates irregularities, bubbles, voids and the like at the surface of the core-forming layer 3, thereby smoothing the surface.

The conditions of the heat treatment are not particularly limited, so long as conditions allow smoothing the surface of the core-forming layer 3 through elimination of irregularities, bubbles, voids and the like. The heat treatment conditions are appropriately selected in accordance with the type of photosensitive polymer that forms the core-forming layer 3. Preferably, the conditions include, for instance, a heat treatment temperature such that the viscosity of the photosensitive polymer that forms the core-forming layer 3 ranges from 1 to 50000 Pa·sec, more preferably from 5 to 10000 Pa·sec. Viscosity is a value measured, under rising temperature, using a cone-plate rheometer (RheoStress RS75, by HAKKE, cone diameter φ 20 mm, angle 2°, 1 Hz).

When using a dry film, the heat treatment is preferably carried out with the protective film stripped off, since doing so results in an enhanced smoothing effect. When carrying out the heat treatment with the surface of the core-forming layer 3 covered by the protective film, the temperature of the heat treatment must be selected taking into account the heat resistance of the protective film.

The duration of the heat treatment ranges preferably from about 10 to 30 minutes.

The heat treatment method is not particularly limited. Specifically, the heat treatment employed may involve heating in an oven set to a predetermined temperature, or heating on a hot plate.

Figure 1D:
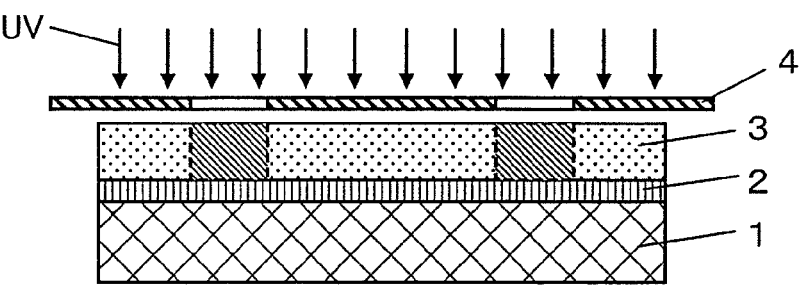
FIG. 1D is a schematic cross-sectional diagram for explaining one step in a method for manufacturing an optical waveguide in one embodiment of the present invention.

Next, the heat-treated core-forming layer 3 is selectively exposed via the a photomask 4 having a pattern for forming cores, as illustrated in FIG. 1D, to form cores thereby.

Exposure is not particularly limited, provided that it is carried out with a required intensity of light having a wavelength that is capable of selectively modifying (curing or the like) the surface of the core-forming layer 3, via the photomask 4. The exposure method used may be, for instance, contact exposure in which the photomask 4 is placed in contact with the surface of the core-forming layer 3, or projection exposure in which a predetermined gap is kept between the photomask and the surface, so that the photomask does not touch the surface. When carrying out contact exposure, a 5 to 15 μm-thick release film comprising for instance a PET film is preferably interposed between the photomask 4 and the core-forming layer 3, in order to prevent adhesion of the core-forming layer 3 to the photomask 4. The release film is disposed in such a manner so as not to hide the exposure portions.

Exposure conditions are specifically selected in accordance with the type of photosensitive polymer. In the case of a UV-curable resin, for instance, exposure is carried out with UV rays of about 365 nm at an intensity of 500 to 2500 mJ.

When using a photocurable resin, the latter may be post-cured by heating, after exposure, to ensure reliable curing. Preferred post-curing heating conditions include a heating temperature of 80 to 160° C. over 20 to 120 minutes.

Figure 1E:
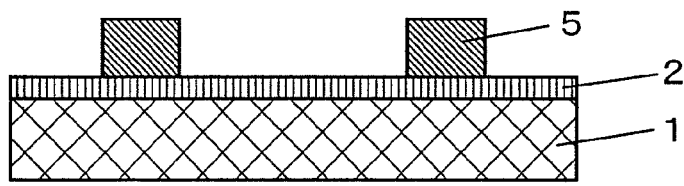
FIG. 1E is a schematic cross-sectional diagram for explaining one step in a method for manufacturing an optical waveguide in one embodiment of the present invention.

Next, the cores 5 are formed through developing, as the case may require, of the selectively exposed core-forming layer, as illustrated in FIG. 1E. Developing may be omitted when the photosensitive polymer material used is a material such that the refractive index thereof changes at exposed portions.

Developing is a process in which unexposed portions, in the case of positive developing, or exposed portions, in the case of negative developing, are removed using a developer. Specific examples of the developer include, for instance, acetone, isopropyl alcohol, toluene, ethylene glycol or a mixture of the foregoing at predetermined proportions. An aqueous developer such as the one disclosed in Japanese Patent Application Laid-open No. 2007-292964 A may also be preferably used. The developing method may involve spraying the developer or may involve ultrasonic cleaning.

Figure 1F:
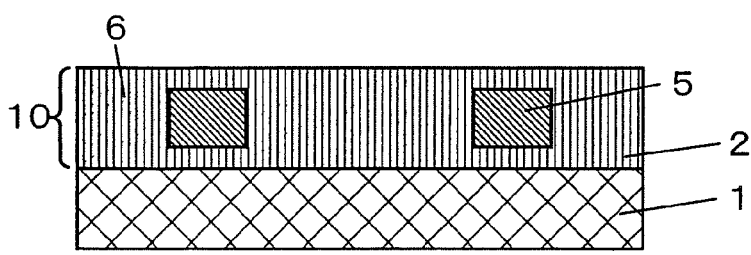
FIG. 1F is a schematic cross-sectional diagram for explaining one step in a method for manufacturing an optical waveguide in one embodiment of the present invention.

Lastly, the cores 5 are buried in an upper cladding layer 6, as illustrated in FIG. 1F. Formation of the upper cladding layer 6 is omitted when the photosensitive polymer used in the core-forming layer 3 is a material such that the refractive index thereof changes at exposed portions. The unexposed portions of the core-forming layer 3 function then as the upper cladding layer.

The method of forming the upper cladding layer 6 may involve coating a liquid curable resin for forming the upper cladding layer 6 in such a way so as to bury the cores 5, followed by curing by heat, light or the like. Another method may involve coating a varnish of a curable resin for forming the upper cladding layer 6, followed by curing by heat, light or the like. Yet another method may involve bonding a resin film for forming the upper cladding layer 6, followed by curing by heat, light or the like.

The curable resin for forming the upper cladding layer 6 is not particularly limited, so long as it is a material having a lower refractive index, at the transmission wavelength of the guided light, than that of the cores 5. The type of curable resin used is preferably the same as the material that forms the lower cladding layer 2.

The thickness of the upper cladding layer 6 is not particularly limited, but is preferably a thickness that allows preserving a height, from the surface of the cores 5, comparable to the thickness of the lower cladding layer 2. When developing is not necessary, through the use of a core material of variable refractive index, the upper cladding layer 6 is preferably formed on the core-forming layer 3 to a thickness comparable to that of the lower cladding layer 2.

An optical waveguide 10 such as the one illustrated in FIG. 1F is obtained as a result of the above process.

The optical waveguide 10 is formed of cores 5 comprising a polymer and of cladding layers (lower cladding layer 2 and upper cladding layer 6) that cover the cores 5. The refractive index of the cores 5 is higher than the refractive indices of the cladding layers, and hence the light propagating through the cores 5 is confined in the cores 5 through total reflection. Such an optical waveguide 10 is used mainly as a multimode waveguide. The cross-sectional shape of the cores 5 is, for instance, a 20 to 100 μm rectangular shape. The thickness of the lower cladding layer and the upper cladding layer is of about 5 to 15 μm, excluding the thickness of the layer that comprises the cores 5. The refractive index difference between the cores 5 and the cladding layers (lower cladding layer 2 and upper cladding layer 6) is not particularly limited, but ranges preferably from 0.5 to 3%.

EXAMPLES

The present invention will be explained in detail based on examples. However, the present invention is in no way meant to be limited to or by these examples.

A method for manufacturing an epoxy film used for forming the cladding layers of the cores will be explained first.

Preparation Example 1

Preparation of an Epoxy Film A

In a mixed solvent of 30 parts by weight of toluene and 70 parts by weight of MEK there were dissolved 7 parts by weight of polypropylene glycol glycidyl ether ("PG207" by Tohto Kasei), 25 parts by weight of a liquid hydrogenated bisphenol-A epoxy resin ("YX8000" by Japan Epoxy Resin), 20 parts by weight of a solid hydrogenated bisphenol-A epoxy resin ("YL7170" by Japan Epoxy Resin), 8 parts by weight of an addition product of 1-2-epoxy-4(2-oxiranyl)-cyclohexane and 2,2-bis(hydroxymethyl)-1-butanol ("EHPE-3150" by Daicel Chemical Industries), 2 parts by weight of a solid bisphenol-A epoxy resin ("Epicoat 1006FS" by Japan Epoxy Resin), 20 parts by weight of a phenoxy resin ("YP50", by Tohto Kasei), 0.5 parts by weight of a photo-cationic curing initiator ("SP170" by ADEKA), and 0.5 parts by weight of a thermo-cationic curing initiator ("SI-150L" by Sanshin Chemical Industries), as well as 0.1 parts by weight of a surface conditioner ("F470" by DIC Corporation). The obtained solution was filtered through a 1 µm-pore membrane filter and was vacuum-defoamed to prepare an epoxy resin varnish.

The obtained epoxy resin varnish was applied onto a 50 µm-thick PET film using a bar coater, was dried a first time at 80° C. for 10 minutes and a second time at 120° C. for 10 minutes, to yield a 15 µm-thick epoxy film A. The refractive index of the epoxy film A at 579 nm light was 1.54. The surface of the epoxy film A was covered with a 35 µm biaxially oriented polypropylene (OPP) film (protective film).

Preparation Example 2

Preparation of an Epoxy Film B

In a mixed solvent of 24 parts by weight of toluene and 56 parts by weight of MEK there were dissolved 42 parts by weight of a liquid bisphenol A epoxy resin ("Epiclon 850S", by DIC Corporation), 55 parts by weight of a solid bisphenol-A epoxy resin ("Epicoat 1006FS" by Japan Epoxy Resin), 3 parts by weight of a phenoxy resin ("YP50", by Tohto Kasei), 1 part by weight of a photo-cationic curing initiator ("SP170" by ADEKA), and 0.1 parts by weight of a surface conditioner ("F470" by DIC Corporation). The obtained solution was filtered through a 1 µm-pore membrane filter and was vacuum-defoamed to prepare an epoxy resin varnish.

The obtained epoxy resin varnish was made into a film in the same way as in Preparation example 1, to yield an epoxy film B having a thickness of 40 µm. The refractive index of the epoxy film B at 579 nm light was 1.59. The surface of the epoxy film B was covered with a 35 µm OPP film.

Preparation Example 3

Preparation of an Epoxy Film C

An epoxy film C was prepared in the same way as in Preparation example 1, but to a thickness of 55 µm, instead of 15 µm. The refractive index of the epoxy film C at 579 nm light was 1.54. The surface of the epoxy film C was covered with a 35 µm OPP film.

Example 1

The epoxy film A, having had the OPP film stripped therefrom, was overlaid on the surface of a polycarbonate substrate. The resulting stack was laminated by being hot-pressed at 60° C. and 0.2 MPa for 120 seconds. The epoxy film A was cured through irradiation of 2000 mJ of UV rays having a wavelength of 365 nm, using a super high-pressure mercury lamp. A lower cladding layer was formed on the surface of the polycarbonate substrate by stripping the PET film from the epoxy film A surface.

The epoxy film B, having had the OPP film stripped therefrom, was then overlaid onto the surface of the lower cladding layer thus formed, and the resulting stack was laminated by being hot-pressed at 0.60° C. and 0.2 MPa for 120 seconds. The PET film covering the surface of the laminated epoxy film B was stripped, and then the laminate was subjected to a heat treatment for 20 minutes in an oven set to 100° C., to melt thereby the surface of the epoxy film B. The laminate was removed from the oven and left to cool.

Next, a photomask having 20 slits 40 µm wide and 110 mm long, at intervals of 250 µm, was contacted to the surface of the heat-treated epoxy film B, to mask the latter. The portions of the epoxy film B corresponding to the slits were then cured through irradiation of 2000 mJ of UV rays having a wavelength of 365 nm, emitted by a super high-pressure mercury lamp and adjusted into parallel beams, via the photomask. Cores were then formed by developing, using "Cleanthrough" (freon-alternative aqueous cleaning agent), by Kao, as a developer.

Figure 3A:
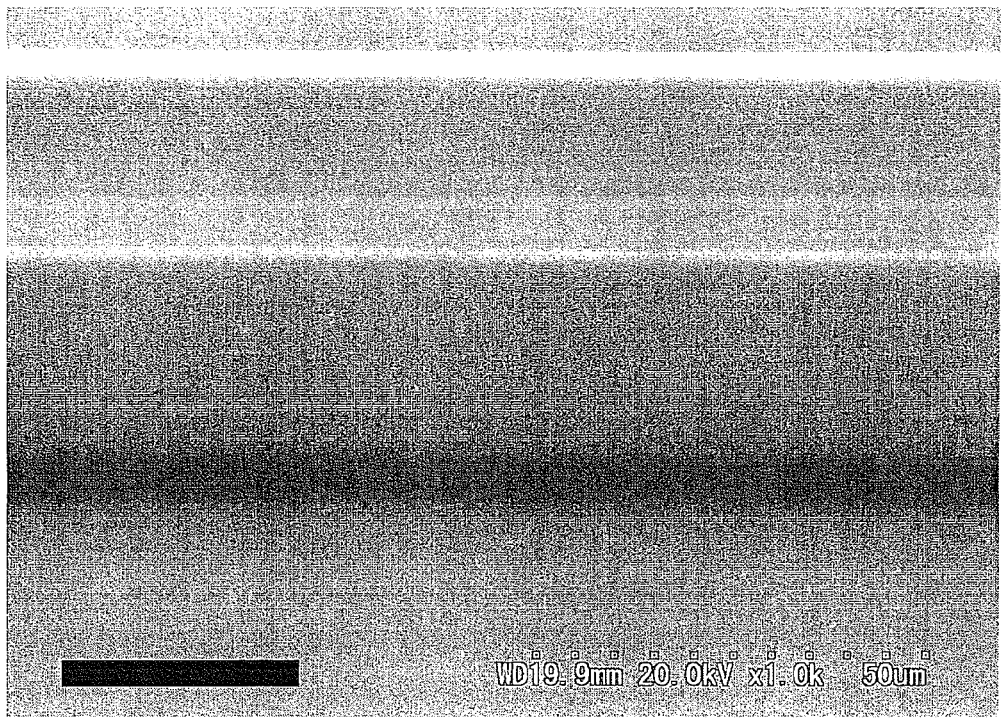
FIG. 3A is a SEM micrograph obtained during SEM observation of the side face of a core of an optical waveguide obtained in Example 1.

The side faces of the formed cores were observed using a scanning electron microscope (SEM). The SEM micrographs are depicted in FIG. 3A.

The epoxy film C, having the OPP film stripped therefrom, was overlaid on the surface of the formed cores, and the resulting stack was laminated by being heat-pressed at 80° C. and 0.2 MPa for 120 seconds. The epoxy film C was cured through irradiation of 2000 mJ of UV rays having a wavelength of 365 nm, using a super high-pressure mercury lamp. The upper cladding layer was formed by stripping the PET film off the surface of the epoxy film C, to yield thereby an optical waveguide. The obtained optical waveguide was evaluated as follows.

[Evaluation Method]
(Light Loss Through Wave Guide)

Figure 4:
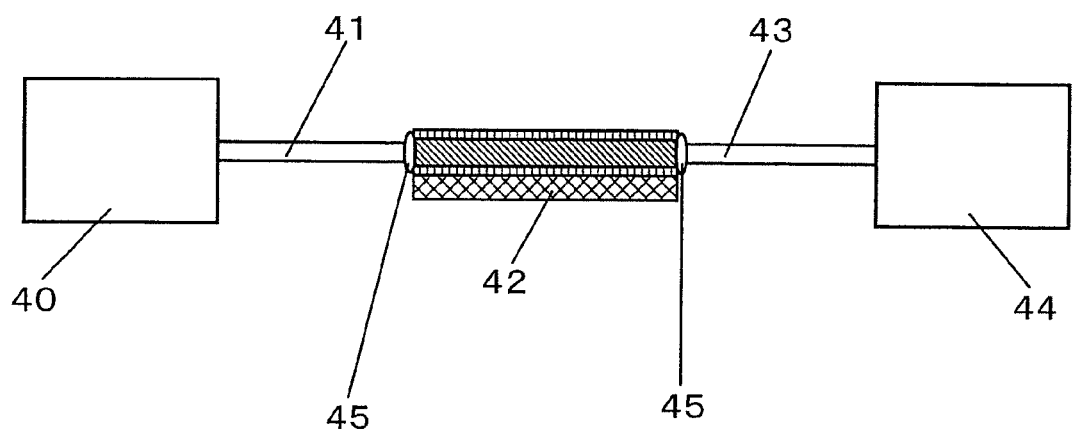
FIG. 4 is a schematic diagram for explaining the configuration of an apparatus used for evaluating wave loss in examples.

Light loss was evaluated using an apparatus configuration as illustrated in FIG. 4. In FIG. 4, the reference numeral 40 denotes an LED light source that emits 850 nm light, 41 denotes a single-mode fiber coupled to the LED light source 40, 42 denotes an optical waveguide, 43 denotes a plastic cladding fiber (PCF), 44 denotes a power meter, and 45 denotes a refractive index matching agent.

Both end faces of the obtained optical waveguide sample were polished to yield a 100 mm-long optical waveguide 42. Next, 850 nm light from the LED light source 40 of a unit configured as illustrated in FIG. 4 was caused to strike the optical waveguide 42 via the single-mode fiber 41. The light exiting through the optical waveguide 42 was incident, via the PCF 43, onto the power meter 44, which measured the intensity of the light. The light loss, averaged for the 20 cores, was of 0.15 dB/cm.

(Viscosity Measurement)

The viscosity of the epoxy film B at the heat treatment temperature was measured, under rising temperature, at 1 Hz, using a cone-plate rheometer (RheoStress RS75, by HAKKE, cone diameter φ 20 mm, angle 2°).

(Smoothness)

The faces of the formed cores were observed by SEM at 1000 magnifications. The condition of the faces of the cores as imaged at 10 equidistant points in the longitudinal direction was assessed in accordance with the criteria below, taking as a reference sample the surface state in the SEM micrograph illustrated in FIG. 3A.

A: instances with 8 or more points having a smooth appearance identical or superior to that of the reference sample.

B: instances with 3 to fewer than 8 points having a smooth appearance identical or superior to that of the reference sample.

C: instances with fewer than 3 points having a smooth appearance identical or superior to that of the reference sample.

The evaluation results are summarized in Table 1.

Comparative Example 1

Figure 3B:
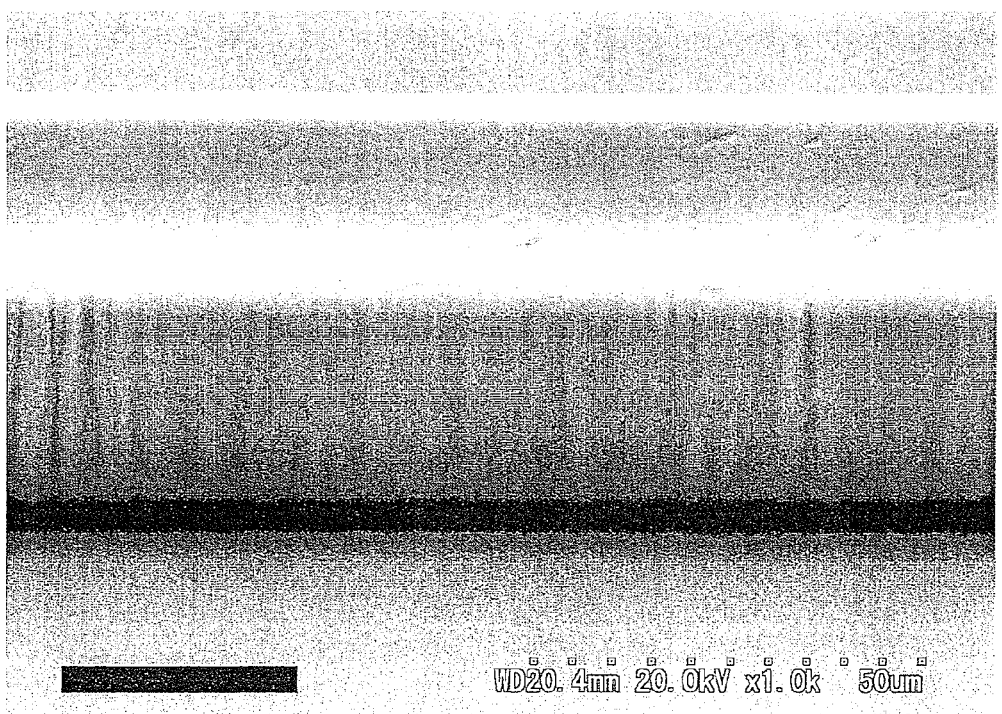
FIG. 3B is a SEM micrograph obtained during SEM observation of the side face of a core of an optical waveguide obtained in Comparative example 1.

An optical waveguide was formed in the same way as in Example 1, but herein the laminated epoxy film B was not heat treated. The optical waveguide was evaluated in the same way as in Example 1. The evaluation results are summarized in Table 1. The faces of the formed cores were observed using a scanning electron microscope (SEM). The SEM micrographs are depicted in FIG. 3B. The light loss of the obtained optical waveguide was 0.30 dB/cm.

The light loss of the optical waveguide of Example 1 obtained by heat-treating the core-forming layer was 0.15 dB/cm, which is about half the loss of 0.30 dB/cm of the optical waveguide of Comparative example 1, in which the core-forming layer was not heat-treated. Observation of the SEM micrograph of the cores of the optical waveguide of Comparative example 1, illustrated in FIG. 3B, reveals bubbles, voids and numerous stripe-like projections in the thickness direction. By contrast, the SEM micrograph of the cores of the optical waveguide of Example 1, illustrated in FIG. 3A, reveals a smooth surface, with no projections or bubbles.

Examples 2 to 17

Optical waveguides were manufactured and evaluated in the same way as in Example 1 but varying the heat treatment conditions as set forth in Tables 1 and 2. The results are given in Tables 1 and 2.

temperature varied from 50 to 150° C., as compared to Comparative example 1, in which no heat treatment was carried out. In the above heat treatment conditions, the viscosity of the epoxy resin B was 1 to 50000 Pa·sec. Light loss was particularly low when the heat treatment was conducted at 60 to 120° C., i.e. when the viscosity of the epoxy resin B was 5 to 10000 Pa·sec.

Example 18

An optical waveguide was manufactured and evaluated in the same way as in Example 1, but carrying out the heat treatment at 100° C., for 20 minutes, with the surface of the epoxy film B covered with the PET film, the PET film being stripped off the material surface after the temperature reverted to room temperature, instead of carrying out the heat treatment after stripping the PET film that covers the surface of the laminated epoxy film B. The light loss of the obtained optical waveguide was 0.23 dB/cm. The smoothness rating was "B".

Example 19

A liquid UV-curable epoxy resin ("OC3515", by EMI in USA, having a refractive index of 1.50 at 579 nm light) was dripped onto the surface of a polycarbonate substrate, and was spin-coated thereon at 300 rpm for 10 seconds, and 700 rpm for 60 seconds. The epoxy resin was cured under irradiation of 2500 mJ of UV rays having a 365 nm wavelength, from a super-high pressure mercury lamp, to form a 10 μm thick lower cladding layer.

Next, a liquid UV-curable resin ("OC3553", by EMI in USA, having a refractive index of 1.52 at 579 nm light) was dripped onto the surface of the formed lower cladding layer,

TABLE 1

| | EXAMPLE NO. | | | | | | | | | COMP. EX. 1 |
|---|---|---|---|---|---|---|---|---|---|---|
| | 1 | 2 | 3 | 4 | 5 | 6 | 7 | 8 | 9 | |
| HEAT TREATMENT TEMPERATURE (° C.) | 100 | 50 | 60 | 70 | 90 | 110 | 120 | 140 | 150 | — |
| HEAT TREATMENT TIME (min) | 20 | 20 | 20 | 20 | 20 | 20 | 20 | 20 | 20 | — |
| VISCOSITY (Pa · sec) | 32 | 50000 | 10000 | 1800 | 120 | 13 | 5 | 1 | 0.5 | — |
| SMOOTHNESS | A | A | A | A | A | A | A | A | A | C |
| LIGHT LOSS THROUGH WAVEGUIDE [dB/cm] | 0.15 | 0.19 | 0.16 | 0.14 | 0.15 | 0.15 | 0.16 | 0.19 | 0.18 | 0.3 |

TABLE 2

| | EXAMPLE NO. | | | | | | | |
|---|---|---|---|---|---|---|---|---|
| | 10 | 11 | 12 | 13 | 14 | 15 | 16 | 17 |
| HEAT TREATMENT TEMPERATURE (° C.) | 100 | 100 | 100 | 100 | 100 | 100 | 100 | 100 |
| HEAT TREATMENT TIME (min) | 5 | 10 | 15 | 20 | 25 | 30 | 35 | 40 |
| VISCOSITY (Pa · sec) | 32 | 32 | 32 | 32 | 32 | 32 | 32 | 32 |
| SMOOTHNESS | B | A | A | A | A | A | A | A |
| LIGHT LOSS THROUGH WAVEGUIDE [dB/cm] | 0.28 | 0.18 | 0.15 | 0.14 | 0.15 | 0.15 | 0.15 | 0.14 |

A comparison of the results shows that smoothness was greater, and light loss lower, in Examples 1 to 9, where the treatment time was fixed at 20 minutes and the heat treatment and was spin-coated thereon at 1400 rpm for 30 seconds, to form thereby a 40 μm thick core-forming layer. The viscosity of the core-forming layer was lowered as a result of a heat treatment at 60° C. for 20 minutes in an oven. The measured viscosity at 60° C. of the UV-curable epoxy resin "OC3553" was of about 1 Pa·sec.

Next, a photomask having 20 slits 40 µm wide and 110 mm long, at intervals of 250 µm, was contacted onto the surface of the heat-treated core-forming layer, to mask the latter. The portions of the core-forming layer corresponding to the slits were then cured through irradiation of 2000 mJ of UV rays having a wavelength of 365 nm, emitted by a super high-pressure mercury lamp and adjusted into parallel beams, via the photomask. Cores were then formed by developing, using "Cleanthrough" (freon-alternative aqueous cleaning agent), by Kao, as a developer.

Lastly, a UV-curable epoxy resin "OC3515" was spin coated at 700 rpm for 30 seconds, in such a way so as to cover the entire core-forming layer. The epoxy resin was cured under irradiation of 2500 mJ of UV rays having a 365 nm wavelength, from a super-high pressure mercury lamp, to form a 10 µm thick upper cladding layer and yield thereby an optical waveguide. The obtained optical waveguide was evaluated in the same way as in Example 1. The results are given in Table 3.

Comparative Example 2

An optical waveguide was obtained and evaluated in the same way as in Example 19, except that herein no heat treatment was carried out. The results are given in Table 3.

TABLE 3

| | EXAMPLE NO. | |
|---|---|---|
| | 19 | COMP. EX. 2 |
| HEAT TREATMENT TEMPERATURE (° C.) | 60 | — |
| HEAT TREATMENT TIME (min) | 20 | — |
| VISCOSITY (Pa · sec) | 1 | — |
| SMOOTHNESS | A | C |
| LIGHT LOSS THROUGH WAVEGUIDE [dB/cm] | 0.2 | 0.35 |

In Example 19, a heat treatment was carried out under temperature conditions such that the viscosity of the core-forming layer was 1 Pa·sec, whereby the surface became a smooth surface from which bubbles and voids were eliminated. As a result, light loss was reduced significantly compared with the case of Comparative example 2, in which no heat treatment was carried out.

An aspect of the present invention as explained in detail above is a method for manufacturing an optical waveguide, the method comprising a core-forming layer forming step of forming a core-forming layer, which comprises a photosensitive polymer, on a lower cladding layer formed on a substrate; a smoothing step of smoothing the surface of the core-forming layer by lowering the surface viscosity thereof through a heat treatment of the core-forming layer; and a exposure step of forming a core through selective exposure, for forming a core, to the core-forming layer from the surface of the smoothed core-forming layer. In such a manufacturing method, the viscosity of the surface of the core-forming layer is lowered, in such a manner so as to smoothen the surface, by heat-treating the surface layer before exposure, via a photomask, of predetermined portions of the core-forming layer formed on the surface of a lower cladding layer. In such a heat treatment, the surface tension resulting from melting or softening of the surface by heat has the effect of eliminating bubbles, voids and the like from the surface, thereby smoothing the surface. A core having the smooth surface layer, exhibiting excellent shape stability, and in which no superfluous photosensitive portions are formed in regions covered by a photomask, is formed by exposure, via the photomask, of the core-forming layer having had the surface layer portion thereof smoothed as described above. Guided light loss is suppressed as a result in an optical waveguide having such a core.

Preferably, the heat treatment conditions in the smoothing step include a temperature such that the viscosity of the photosensitive polymer is 1 to 50000 Pa·sec, in terms of sufficiently smoothing the surface layer of the core-forming layer and eliminating bubbles and voids therefrom by sufficiently lowering the viscosity of the surface of the core-forming layer.

Preferably, the photocurable polymer is a resin composition containing a bisphenol type epoxy resin and a photo-cationic curing agent, since in this case there can be obtained a waveguide having high heat resistance and which can be combined with printed boards and the like.

Preferably, the core-forming layer formation step is a step of bonding a film of the photosensitive polymer, which is formed beforehand, to a surface of the lower cladding layer. Such a step is preferable in that it affords a simple operation in which the core-forming layer can be formed easily. During bonding of such a film, the face that is not to be bonded is ordinarily protected by a protective film. In this case, the heat treatment is preferably carried out with the protective film stripped off.

The invention claimed is:

1. A method for manufacturing an optical waveguide, the method comprising:
    forming a core-forming layer of a photosensitive polymer on a lower cladding layer formed on a substrate;
    smoothing the surface of the core-forming layer by lowering the surface viscosity thereof through a heat treatment of the core-forming layer to obtain a viscosity of the photosensitive polymer ranging from 5 to 10000 Pa·sec; and
    forming a core through selective exposure to the core-forming layer from the surface of the smoothed core-forming layer.

2. The method for manufacturing an optical waveguide according to claim 1, wherein the heat treatment is a treatment of smoothing the surface of the core-forming layer by softening the surface by heat.

3. The method for manufacturing an optical waveguide according to claim 1, wherein the heat treatment is a treatment of smoothing the surface of the core-forming layer by melting the surface by heat.

4. The method for manufacturing an optical waveguide according to claim 1,
    wherein heat treatment conditions in the smoothing include a temperature such that a viscosity of the photosensitive polymer is 13 to 1800 Pa·sec.

5. The method for manufacturing an optical waveguide according to claim 1,
    wherein the photosensitive polymer is a photocurable polymer.

6. The method for manufacturing an optical waveguide according to claim 5, wherein the photocurable polymer contains a bisphenol type epoxy resin and a photo-cationic curing agent.

7. The method for manufacturing an optical waveguide according to claim 1,
wherein the core-forming layer formation bonds a film of the photosensitive polymer, which is formed beforehand, to the surface of the lower cladding layer.

8. The method for manufacturing an optical waveguide according to claim 7, wherein the film is a film formed of a semi-cured photocurable polymer.

9. The method for manufacturing an optical waveguide according to claim 7,
wherein the film is protected beforehand by a protective film, and is subjected to the heat treatment after stripping of the protective film.

\* \* \* \* \*